D. G. STEELY.
CONTINUOUS CONFECTIONERY MAKING SYSTEM.
APPLICATION FILED JUNE 7, 1919.
1,432,918.
Patented Oct. 24, 1922.
3 SHEETS—SHEET 1.
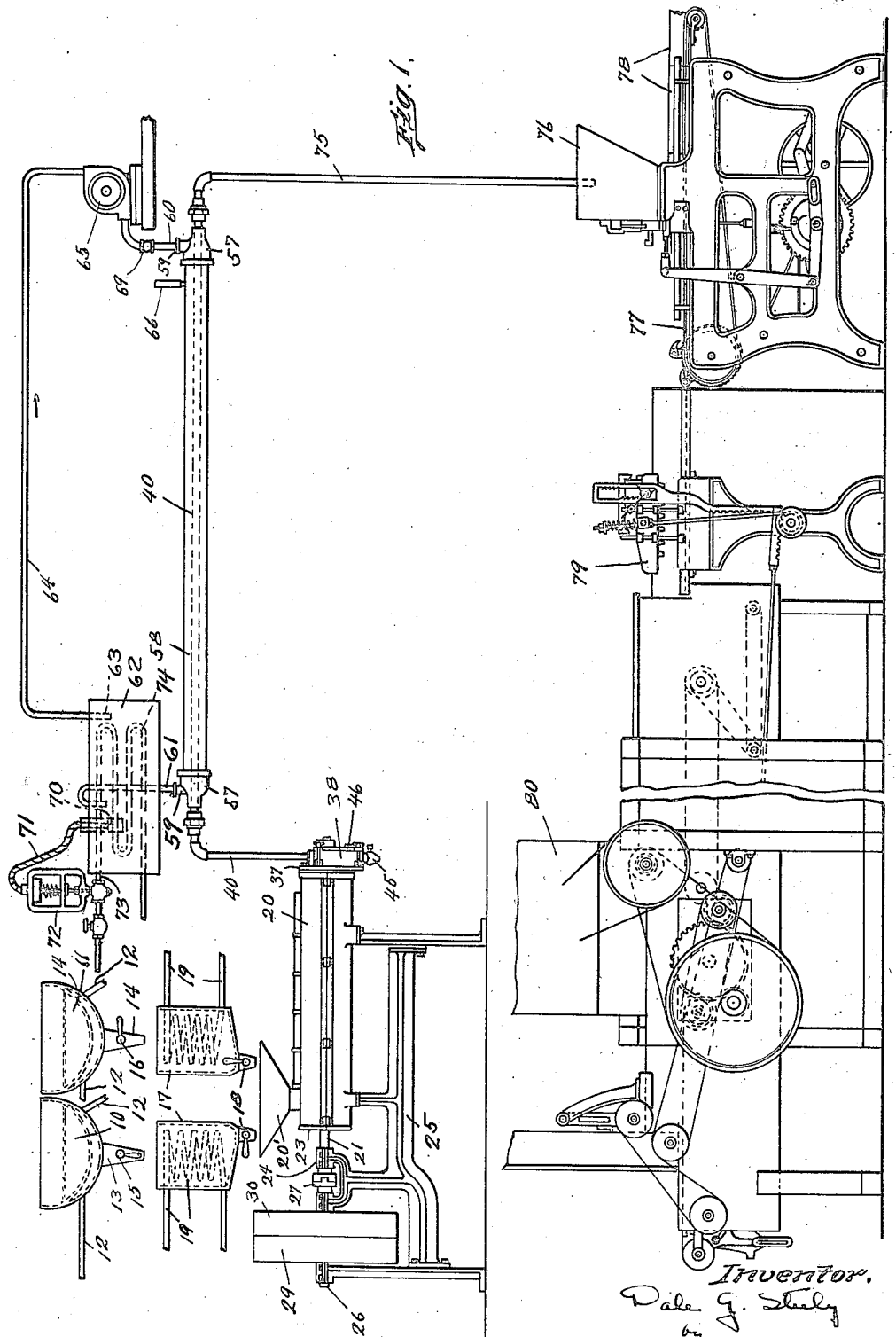

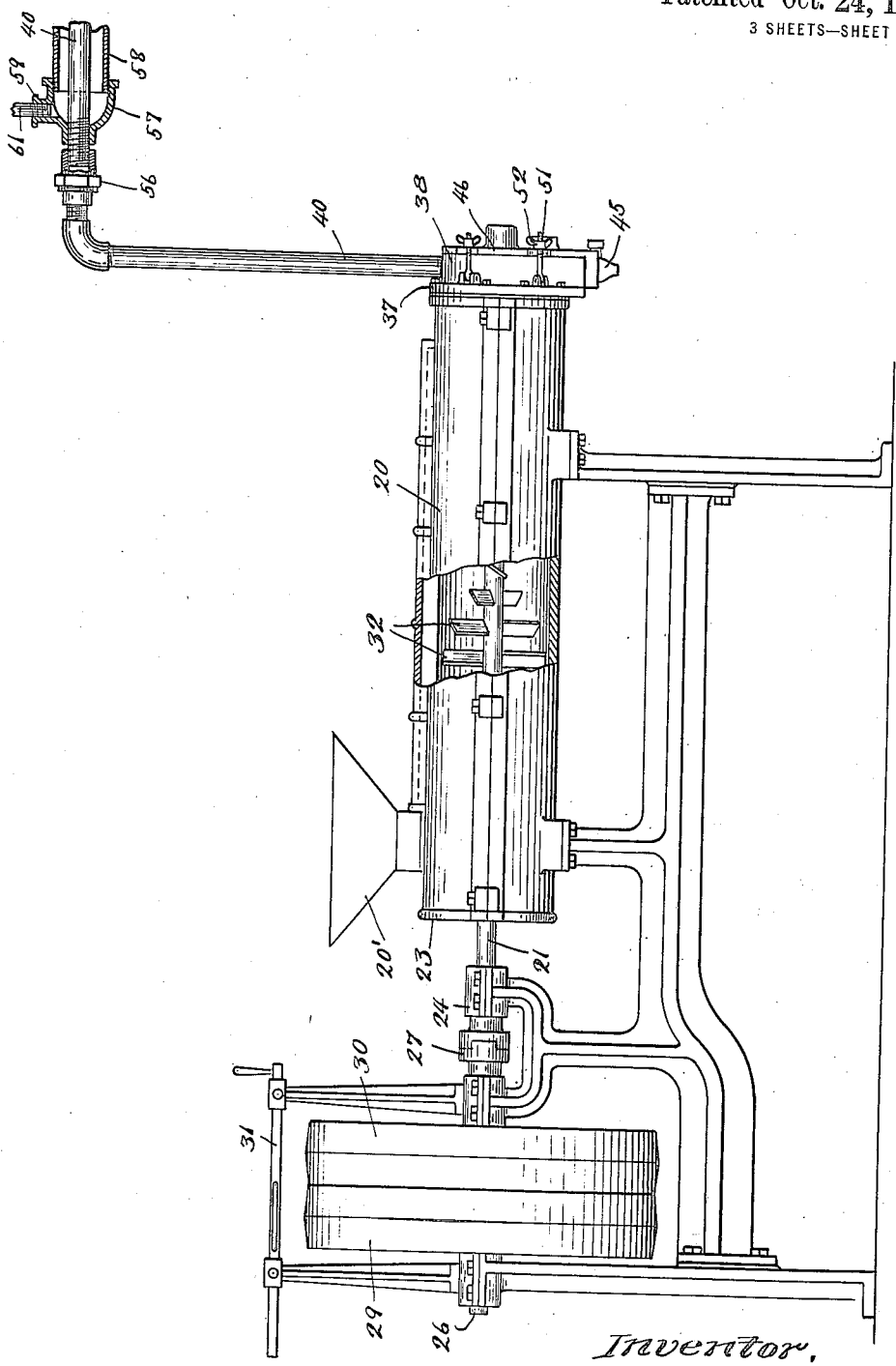

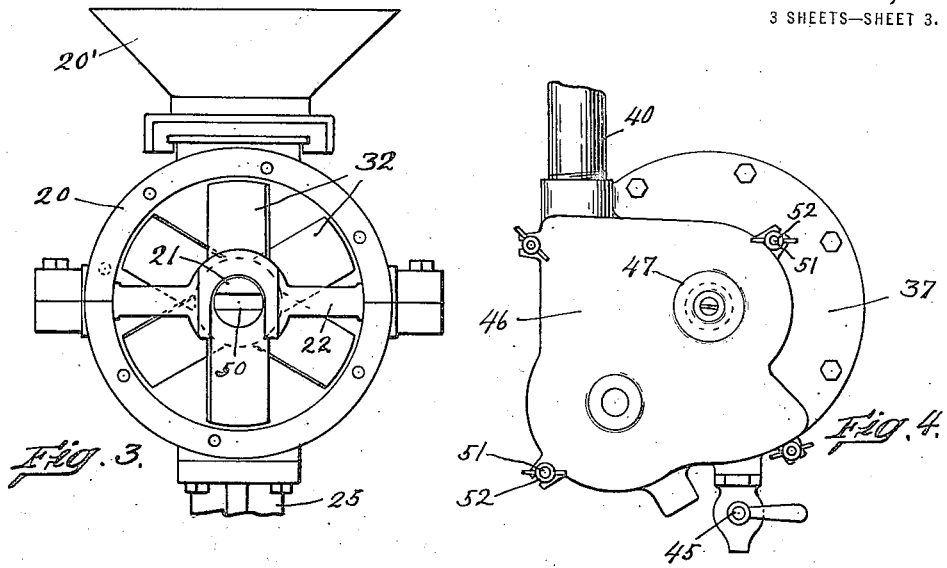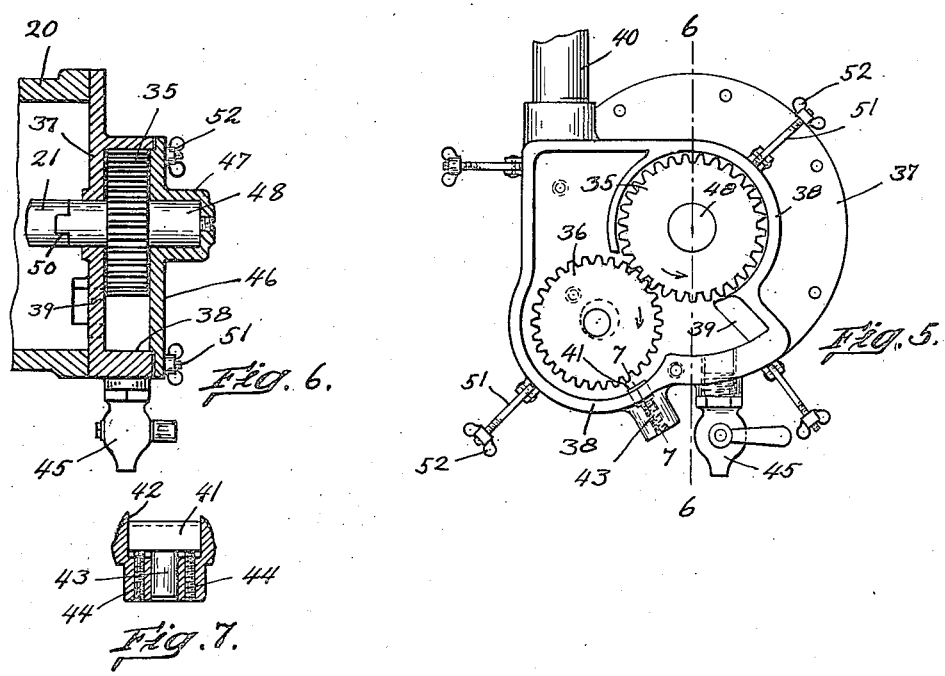

Patented Oct. 24, 1922.

1,432,918

UNITED STATES PATENT OFFICE.

DALE G. STEELY, OF ARLINGTON, MASSACHUSETTS.

CONTINUOUS CONFECTIONERY-MAKING SYSTEM.

Application filed June 7, 1919. Serial No. 302,542.

*To all whom it may concern:*

Be it known that I, DALE G. STEELY, a citizen of the United States, and resident of Arlington, in the county of Middlesex and State of Massachusetts, have invented an Improvement in Continuous Confectionery-Making Systems, of which the following is a specification.

This invention relates to confectionery making apparatus. Heretofore it has been customary in making a certain kind of confection to prepare what is termed a fondant and then cast this fondant into the required shape for the confections. In the usual process of manufacture a cooker is employed by which the sugar is formed into a syrup, which is run into a cooler and as cooled passes to a beater by which the cooled syrup is beaten or whipped into a fondant. Then this fondant may be stored away for a period of time in vats, where it cools and becomes firm or hard. Later it is delivered to a melter where it is melted and heated to the proper temperature for casting into moulds to the required shape. While, strictly considered, the fondant may not be actually melted in the melter, yet its fluidity is increased by the application of heat whereby it may readily be subjected to further treatment; and for convenience the fondant heating means will hereafter be referred to as a melter and the heated and more fluid fondant, as heated fondant.

The various steps of the process have usually been independent of each other, being carried on by separate units, but some of the units have been combined to insure continuity of operation between them, as for instance, the cooker and cooler have been combined together, and so also the cooler and heater, but, so far as I am aware, the beater has never been combined with the depositor or with the melter, nor have all of the means been combined together to insure continuity of operation as a system.

The above-described method of making a confection is obviously relatively slow and expensive as the various apparatus and machines cannot be utilized or operated and therefore their full capacity is not utilized; a suitable amount of storage space is required in which to store the fondant previous to transferring it to the melter; and a considerable amount of labor and time is involved in transferring the fondant from the beater to the place of storage and subsequently to the melter.

An object of my invention is the production of a system adapted for the continuous manufacture of confectionery and in which the sugar and other ingredients for the forming of the fondant are introduced into the system at one end and issue from the system at the other end formed into the required shape.

In the process of manufacture of molded fondant from the raw materials, the usual steps include a cooker in which the sugar is formed into a syrup, a cooler for the hot syrup, a beater in which the cooled syrup is whipped or beaten into a fondant, a melter by which the fondant is melted previous to its introduction into the depositor, and a depositor which receives the melted fondant and casts it in molds to the required shape.

My invention includes, as a part of my newly devised system, a continuous cooker associated with a continuous cooler. The cooker is adapted to form the sugar or other substance or substances into a syrup which, as formed, is caused to flow into the cooler. The cooker is adapted to maintain a substantially continuous supply of syrup in the cooler to be cooled. From the cooler the cooled syrup is adapted to pass, without substantial interruption, into a fondant beater and I provide means for operating said beater continuously so that a continuous supply of fondant is caused to issue therefrom.

I provide means to continually and automatically conduct or direct the fondant, as it is formed during the operation of the beater, to the fondant depositing machine to be deposited in molds to the required shape and I melt the fondant in transit so that the fondant is continually fed to the depositor in melted condition.

Therefore a further object of my invention is in the provision of means for the continuous transfer of fondant, as it is formed, from the beater to the continuous melter; which means may comprise a conducting device, such as a pump adapted to act upon and forcibly conduct the plastic fondant to the melter from the beater. The capacity of the conducting device may be such that it transfers fondant to the melter in proportion to its formation in the beater; and is preferably regulatable at the will of an operative to adjust it to remove fondant in proportion to its formation in the beater.

A further object of my invention resides in a continuous melter for fondant in transit from the beater to the depositor whereby the operation of the system is facilitated and also whereby the automatic transfer of fondant from the beater to the depositor is permitted and facilitated.

It is often customary to place the fondant beater and the candy depositing machine in separate rooms and in my system or in the performance of my process I extend a conducting pipe directly from the fondant beater to the depositor and through which fondant is adapted to be forced by the pump which is included in the conducting pipe.

The fondant melter may be of any suitable type which is included in the conducting pipe between the beater and the depositor to melt the fondant as it passes through said pipe. The conducting pipe may in itself, comprise a component of the melter and for this purpose I arrange a jacket comprising a pipe of larger diameter than the fondant pipe and closed at the ends about the conducting pipe, or a part thereof, and I circulate a heating medium, as hot water or steam between the conducting pipe and jacket.

The temperature of the heating medium and its melting effect is adapted to bear such a relation to the rate of flow and quantity of fondant that the fondant in the fondant pipe is melted and maintained in fluid condition at a suitable temperature in said pipe and issues therefrom into the depositor in fluid condition.

Fig. 1 is a diagrammatic view illustrating the arrangement of apparatus for the continuous manufacture of confectionery.

Fig. 2 is a plan view partly in section of a fondant beater and the fondant pump associated therewith and also illustrating a sectional detail of the fondant melter.

Fig. 3 is an end view of the fondant beater along the axis thereof with the end plate removed.

Fig. 4 is an end view of the fondant pump casing.

Fig. 5 is an end view of the pump casing with the pump cover plate removed.

Fig. 6 is a section along lines 6—6 of Fig. 5 illustrating one of the gear impellers.

Fig. 7 is a detail along lines 7—7 of Fig. 5 illustrating means for varying the capacity of the fondant pump.

As here shown, apparatus for the continuous manufacture of molded fondant or confectionery includes a cooker in which the sugar, which may or may not be mixed with glucose or other suitable ingredients, is cooked or formed into a syrup. The cooker may comprise two, or more, similar kettles 10 and 11 adapted to be heated by any suitable means, as by steam pipes 12, and are provided with discharge nozzles 13 and 14 in which are valves 15 and 16 to govern the discharge of cooked syrup into the syrup coolers 17, 17.

In the form of cooler here shown the cooling is necessarily intermittent, as the entire batch is dumped from a kettle into a cooler and allowed to stand for from 20 to 40 minutes before it cools enough to open the bottom valve and allow the syrup to flow to the beater.

While the sugar is adapted to be formed in said kettles in batches, and thereby each is adapted to intermittently deliver syrup to a cooler, yet, by the provision of two, or more, kettles, and two or more coolers, of suitable dimensions, the approximation of a continuous flow of syrup is obtained, for as soon as all of the cooled syrup is discharged from one cooler, a cooled batch will be ready and waiting for delivery in the other cooler.

As the object of providing a more or less continuous flow of syrup is to maintain at all times during the operation of the apparatus included in the system a substantially continuous flow of cooled syrup into the fondant beater, the above described arrangement fills all requirements.

The syrup cooler 17 may be of any suitable type and construction and a common type is here illustrated, comprising a syrup tank having an inlet for hot syrup at the top and an outlet 18 for the cooled syrup at the bottom, from which it flows into the fondant beater. The syrup cooling means may comprise the cooling pipes 19 over which the hot syrup is adapted to flow to be cooled and any suitable cooling medium, as cold water, or brine may be caused to flow through said pipes to abstract the heat therefrom.

Whereas, in the batch method of making confectionery it is customary to add flavoring, and other ingredients, as nuts, etc., to the fondant in the fondant melter, and just previous to the dumping of the prepared fondant into the hopper of the depositor, in my system for the continuous manufacture of confectionery I prefer to add the flavoring, and other ingredients into the syrup in the cooking kettle in some cases, and in other cases in the hopper of the beater, whereby they pass with the cooled syrup into the beater and are thoroughly and uniformly distributed throughout the fondant by and during the beating process.

The fondant beater may be of any suitable type and a common form is here shown comprising a cylinder 20 of comparatively great length in proportion to its diameter and provided at one end with the opening 20' adapted to receive the cooled syrup from the cooler 17 for its introduction to the cylinder.

It is to be noted that, as shown, the syrup is caused to flow by gravity from the syrup cookers into the cooler and from the cooler into the beater and for this purpose the cookers may be located in one floor of a building and the beater directly beneath, on the lower floor but it is obvious that other arrangements of transferring syrup to the beater may be provided.

A shaft 21 is extended through the length of said cylinder 20 of the beater and is journalled in a bearing 22 at the end thereof remote from the entrance for the cooled syrup and passed through the closing plate 23 and is journalled in a bearing 24 carried by the frame 25 of the machine. In the construction shown, a separate shaft 26 supported in bearings carried by the frame 25 in axial alignment with said shaft 21 is connected thereto by a coupling 27. Said shaft 26 carries the fixed and loose pulleys 29 and 30 and a belt shifter 31 is arranged to shift a belt, not shown, between the fixed and loose belts to govern the operation of the beater.

A plurality of blades 32 are secured to the beater shaft 21 within said cylinder 20 and are inclined to the axis of said shaft and arranged in spiral spaced relation on said shaft, the arrangement being such that as the shaft is comparatively rapidly rotated, the beaters whip the cooled syrup, introduced into the cylinder 20 through the opening 20', into fondant and at the same time advance the fondant toward the discharge end of the cylinder.

In the usual type of beater the fondant issues from the discharge opening at the end of the cylinder and is caught by buckets or other suitable containers which, when filled, are stored away until it is desired to use the fondant, which may be from one to several days.

In my system for the continuous manufacture of confectionery I conduct or direct the fondant as it is formed to the depositor and melt it in transit, the transfer of fondant from the beater to the depositor being automatic and continuous for so long as the beater is in operation and a supply of fondant is continually being formed therein.

The conducting means for the fondant from the beater to the depositor includes a conducting device comprising a gear pump adapted to receive at its inlet the fondant as it issues from the beater. The gear pump is adapted to force the fondant towards the depositor in its plastic condition which is adapted to be melted in transit. Although I here show a gear pump for this purpose, yet it is obvious that any other suitable fondant conducting or directing means may be utilized for the purpose.

The fondant pump comprises the driving gear 35 and the pump gear 36. Said gears are arranged in a recess in a plate 37 which is adapted to be bolted over the discharge end of the fondant beater cylinder 20 and thereby close said end of the cylinder. A passage 39 is formed in said plate 37 opening into the end of the fondant beater for the passage of fondant as it is formed from the cylinder to the inlet of the pump. The gears are adapted to operate as the ordinary gear pump in intraining fondant between the periphery of the gears and the walls 38 of the recess and carry it into the discharge space where it is forced through the discharge pipe 40.

Means are provided whereby the capacity of the pump may be varied to thereby regulate the discharge of fondant from the pump to substantially equal the rate of formation of the fondant in the beater. Said means comprises a vane 41 movable in a slot 42 in the wall 38 and having a guide lug 43 slidably arranged in a co-operating recess in said walls. Said vane 41 is adapted to project to a greater or less degree into the space between the wall 38 and the pump gear 36 to thereby offer more or less resistance to the flow of fondant therebetween and thereby vary the capacity of the pump. The position of the vane may be adjusted by any suitable means and as here shown two screws 44 are provided which are threaded within the walls 38 and abut against said vane 41. The amount to which said screws project within the casing determines the position of the vane 41 within the casing. A valve 45 is provided which communicates with the inlet chamber of the gear pump whereby, when desired, fondant may issue directly from the beater to be caught by suitable receptacles instead of passing through the pump to the depositor. A pump cover plate 46 is provided which is adapted to fit closely over the gears 35 and 36 to prevent an appreciable back flow of fondant through the clearance space between the gears and the cover and also the gears and the plate 37. Said cover plate 46 is provided with a bearing 47 therein in which one end of a shaft 48, bearing the driving gear 35, is rotatably arranged. The other end of said shaft 48 extends through said plate 37 and is journalled therein and is detachably connected with the bearing shaft 21 by means of the jaw connection 50. The gear cover plate 40 is detachably secured to the plate 37 by the pivoted bolts 51 and wing-nuts 52 which permit convenient and rapid access to the pump gears for cleaning and other purposes.

By the provision of the jaw clutch connecting the pump shaft 48 with the bearing shaft 21 the entire pump mechanism may be easily removed from the fondant beater, for inspection or otherwise.

From the fondant beater the plastic fondant is forced through the discharge pipe or conductor 40 to the depositor and in its passage thereto, is melted. The fondant melter may be of any suitable construction and as here shown is a component part of the discharge pipe or conductor 40. Heads 57 are arranged on each end of said pipe 40 between which a pipe 58 of considerably larger diameter than the diameter of said fondant pipe 40 is secured.

A suitable heating medium as hot water is adapted to flow between said pipes 40 and 58 to thereby melt the fondant. The heads 57 are provided with openings 59 therein and a pipe 60 through which the heating medium is adapted to be introduced into the space between said pipes, is connected to the head remote from the entrance of fondant into the melter and a pipe 61 for the discharge of cooled heating medium is connected to that head 57 adjacent the inlet for the fondant to the fondant melter.

As here shown water is utilized as a heating medium for the fondant to thereby melt it, which is contained in and circulated from the storage tank 62. Steam coils 63 are arranged in said tank to heat the water contained therein and the pipe 61 for the return of the cooled water from the melter communicates or connects with the said tank. The pipe 64 for the flow of hot water from the tank communicates with the top thereof and with a suitable pump, as 65, the discharge end of which is connected with the pipe 60 by means of which a continuous supply of hot water is maintained in the melter.

It is intended that a thermometer or other temperature indicator 66 shall be associated with the melter whereby the temperature of the heating medium may be ascertained; and that thermostatic control provided so that the temperature of the water in the tank can be maintained automatically at any desired degree.

It is desirable and necessary that the temperature of the melted fondant be maintained within quite close limits, and therefore the temperature of the heating medium and its rate of flow should be regulated to bear the proper relation to the rate of flow of fondant through the melter, as it is obvious that there should be a different rate of flow of melted fondant from a beater connected to a depositor at a distance of one hundred feet than there would be to a depositor situated at only fifty feet from the beater. The regulation of the temperature of the heating medium may be accomplished by suitable means as the thermostat bulb 70 filled with an expansible fluid inserted in the water in the heating tank and connected by a tube 71 to a pressure-operated valve 72 inserted in the supply pipe 73 of the tank-heating coil 74; and the rate of flow of the heating medium may be accomplished by varying the speed of the pump 65 or by the valve 69 in the discharge pipe 60 of the pump.

Although I have here illustrated and described but one specific type of continuous melter, yet it is obvious that other melting means for the continuous melting of fondant may be provided. The type of melter here shown, however, has certain advantages. As previously stated, it is often customary to install the fondant beater and the candy depositor in separate rooms. In the operation of my system I extend the fondant pipe or conductor directly between these two machines and utilize my melter as a component part of this pipe. From the melter the melted fondant flows through the pipe 75 into the hopper 76 of the candy depositor.

The candy depositor here shown for illustrating my invention is clearly illustrated and described in Patent No. 661,008, dated Oct. 30, 1900, and comprises an intermittently travelling bed 77 adapted to receive a plurality of trays 78 filled with starch in which depressions of suitable character have been made by the molder 79 of the tray filling machine 80 clearly described and illustrated in Patent No. 648,353, dated April 24, 1900. The depositor comprises means not necessarily shown for measuring predetermined quantities of melted fondant and depositing them in the depressions in the starch in the trays 78, which after being filled are removed from the machine for coating or further manufacturing processes. It may be seen that by the provision of apparatus here illustrated and described a continuous system for the manufacture of confentionery from the introduction of sugar and other ingredients at one end and discharge of deposited fondant at the other end is provided.

I claim:—

1. A continuous confectionery-making system comprising, in combination, syrup-feeding means for a beater, a beater arranged to discharge a continuous stream of fondant, a depositor for the fondant distantly located with respect to said beater, and means to conduct the continuous stream of fondant from said beater to said distant depositor.

2. A continuous confectionery-making system comprising, in combination, syrup-forming means arranged to deliver a continuous supply of syrup to a beater, a beater, means to operate same to discharge a continuous stream of fondant, a depositor distantly located with respect to said beater and means to conduct the continuous stream of fondant from said beater to said distant depositor.

3. A continuous confectionery-making system comprising, in combination, syrup-forming means arranged to deliver a continuous supply of syrup to a beater, a beater, means to operate same to discharge a continuous stream of fondant, a depositor for the fondant distantly located with respect to said beater, and means to conduct the continuous stream of fondant from said beater to said distant depositor and melt the fondant in transit.

4. A continuous confectionery-making system comprising, in combination, syrup-forming means arranged to deliver a continuous supply of syrup to a beater, a beater, means to operate same to discharge a continuous stream of fondant, a depositor for the fondant distantly located with respect to said beater, and conducting means including a pump to conduct the continuous stream of fondant from said beater to said distant depositor.

5. In a continuous confectionery-making system, a fondant melter comprising a conducting pipe through which fondant is forced while it is being melted, means to circulate a heating-medium along said conducting pipe, and means to vary the heating effect thereof to vary the rate of melting the fondant.

6. A continuous confectionery-making system including syrup-forming means arranged to deliver a continuous supply of syrup to a beater, a fondant beater arranged to deliver a continuous supply of fondant to a melter, a melter arranged to deliver a continuous supply of melted fondant to a depositor, a depositor, and means to vary the rate of melting of the fondant.

7. In a continuous confectionery-making system, the combination of a fondant melter, means to force a continous stream of fondant therethrough to be melted, means to circulate a heating-medium through said melter in heat-conducting relationship with said fondant to melt the same and means to vary the heating effect of said heating-medium whereby the fondant may be melted at a predetermined rate.

8. In a continuous confectionery-making system, the combination of a fondant melter, means to force a continuous stream of fondant therethrough to be melted, means to circulate a heating-medium through said melter in heat-conducting relationship with said fondant to melt the same, means to vary the heating effect of the heating-medium and separate means to vary the flow of fondant through said melter whereby the fondant may be melted at a predetermined rate.

9. In a confectionery-making system, a fondant beater comprising a cylinder, an end plate therefor and a fondant pump carried thereby.

10. In a confectionary-making system, a fondant beater comprising a cylinder, a shaft rotatable therein, an end plate for said cylinder, and a fondant pump carried by said end plate, and means operably connecting a rotatable element of said pump with said shaft to be driven thereby.

11. In a confectionery-making system, a fondant beater, comprising a cylinder, an end-plate therefor, a fondant pump carried thereby, said end plate having a passage for fondant therethrough into the pump inlet.

12. In a confectionery-making system, a fondant beater comprising a cylinder, a shaft rotatable therein, an end plate for said cylinder, a fondant pump supported thereby, said pump having a rotatable element, and clutching means connecting said rotatable element with said fondant shaft.

13. In a continuous confectionary-making system, a fondant beater comprising a cylinder, a shaft rotatable therein, an end plate for said cylinder, inter-meshing gears comprising components of a fondant pump carried by said end plate, and a cover-plate enclosing said gears detachably secured to said end plate.

14. In a continuous confectionery-making system, a fondant beater, a fondant pump adapted to receive fondant from said beater, means to deliver fondant from said beater, and means to vary the amount of fondant discharged from said pump.

15. In a continuous confectionery-making system, a fondant beater, means to feed syrup to said beater to be beaten into fondant, means to control the feeding of syrup, a fondant pump to force fondant from the beater to other components of the system, means to conduct fondant discharged from said beater to said pump, and means to control the discharge of fondant from said pump whereby the discharge of fondant may be adjusted to the rate of feeding of syrup to said beater.

16. In a continuous confectionery-making system, the combination with a fondant beater, and means to conduct fondant from said beater to a pump, of a fondant pump to receive fondant from said beater and force it to other components of the system, said pump comprising an enclosing casing having end walls and a side wall, intermeshing gears forming the active elements of the pump rotatable within said casing, the periphery of one of said gears spaced from a side wall of said casing whereby a passage is formed through which fondant is moved in the operation of the pump, and means to vary the capacity of the pump to force fondant, comprising a vane extendible from the side wall of the casing into said passage to thereby obstruct the movement of fondant between said side wall and gear and reduce the capacity of the pump to force fondant.

17. In a continuous confectionery-making system, the combination with a fondant beater and means to conduct fondant therefrom to a fondant pump, of a fondant pump comprising a casing having end walls and a side wall, inter-meshing gears forming the active element of the pump rotatable within said casing and the periphery of one of said gears spaced from the side wall of said casing, thereby forming a passage through which fondant is forced in the operation of the pump, and means to vary the capacity of the pump to force fondant comprising means to vary the dimensions of said passage.

In testimony whereof, I have signed my name to this specification, in the presence of two subscribing witnesses.

DALE G. STEELY.

Witnesses:
WM. V. WALLBURG,
HAROLD A. STUART.